United States Patent
Sule et al.

(10) Patent No.: US 8,549,466 B2
(45) Date of Patent: Oct. 1, 2013

(54) TIERED REGISTER ALLOCATION

(75) Inventors: Dineel Diwakar Sule, Stafford, TX (US); Eric J. Stotzer, Houston, TX (US); Todd T. Hahn, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1966 days.

(21) Appl. No.: 11/457,843

(22) Filed: Jul. 17, 2006

(65) Prior Publication Data
US 2007/0022413 A1   Jan. 25, 2007

Related U.S. Application Data

(60) Provisional application No. 60/699,832, filed on Jul. 15, 2005.

(51) Int. Cl.
*G06F 9/44* (2006.01)
(52) U.S. Cl.
USPC ......................................................... 717/104
(58) Field of Classification Search
None
See application file for complete search history.

(56) References Cited

U.S. PATENT DOCUMENTS

| | | | |
|---|---|---|---|
| 5,946,491 A * | 8/1999 | Aizikowitz et al. | 717/158 |
| 5,951,674 A * | 9/1999 | Moreno | 712/210 |
| 6,457,173 B1 * | 9/2002 | Gupta et al. | 717/149 |
| 6,523,173 B1 * | 2/2003 | Bergner et al. | 717/152 |
| 6,658,551 B1 * | 12/2003 | Berenbaum et al. | 712/24 |
| 6,738,966 B1 * | 5/2004 | Tanaka | 717/140 |
| 6,832,370 B1 * | 12/2004 | Srinivasan et al. | 717/161 |
| 6,983,459 B1 * | 1/2006 | Prosser et al. | 717/158 |
| 7,278,137 B1 * | 10/2007 | Fuhler et al. | 717/153 |
| 2004/0010784 A1 * | 1/2004 | Koseki et al. | 717/155 |
| 2004/0015901 A1 * | 1/2004 | Koseki et al. | 717/140 |
| 2004/0268309 A1 * | 12/2004 | Grover et al. | 717/120 |
| 2009/0064117 A1 * | 3/2009 | Bashkansky et al. | 717/154 |

\* cited by examiner

*Primary Examiner* — Don Wong
*Assistant Examiner* — Daxin Wu
(74) *Attorney, Agent, or Firm* — Robert D. Marshall, Jr.; Wade James Brady, III; Frederick J. Telecky, Jr.

(57) ABSTRACT

A method of register allocation in complier using a computer instruction set having tiered instructions that accesses differing numbers of registers makes a first preliminary register allocation attempt using an initially specified register set for each instruction. If this fails, the method identifies instructions having an initially specified limited register having a variable not register allocatable. The method makes a second preliminary register allocation attempt except using a less restrictive register set for the identified instructions. This method employs a next less restrictive register set and re-attempts preliminary register allocations for instructions with more than two levels of register restriction.

6 Claims, 2 Drawing Sheets

TIERED REGISTER ALLOCATION

CLAIM OF PRIORITY

This application claims priority under 35 U.S.C. 119(e)(1) to U.S. Provisional Application No. 60/699,832 filed Jul. 15, 2005.

TECHNICAL FIELD OF THE INVENTION

The technical field of this invention is register allocation in generation of data processor object code.

BACKGROUND OF THE INVENTION

Data processors such as microprocessors typically use data register files located in close proximity to the data path functional units to temporarily store data. These data registers are typically so close to the data path functional units that they can be both read and written to in a single data processing instruction cycle. It typically requires more time and often much more instructions to access variables stored only in memory.

Data processors are generally programmed in a high level language that is easily understandable to a programmer. High level languages typically do not expose the data registers to direct manipulation by the programmer. These high level languages typically consider the programmer generated source code and allocate registers during conversion to object code directly executable by the data processor. This conversion is called compiling. During compilation the compiler must determine how to use the available data registers to perform the functions specified by the programmer in the source code. This process is called register allocation.

Some data processors permit multiple versions of certain instructions. These data processors are said to have a tiered architecture. Some versions of these instructions are more efficient in program memory use. But such program memory efficiency may come at the cost of sacrificing the ability to reach some of the available data registers. Efficiently allocating registers on such tiered architectures is a difficult problem. The compiler must attempt to generate the most efficient object code to minimize program memory size while preserving operational speed.

There are two solutions known for register allocation in a tiered architecture. The first solution allocates registers to the inputs/outputs of multi-version instructions from the whole register file without forcing them to be from the more restricted subset of registers. Thus all multi-version instructions are implemented in the least restrictive data register form. This will often result in some of the multi-version instructions not resolving to their most efficient form because their inputs are not part of the restricted registers subset. The second solution always restricts the inputs and outputs of the instructions to belong to the most restricted register set. This insures that any instructions within the most restricted register set will properly resolve to the efficient form. This often results in registers being unavailable which might have been available in a less restrictive register set instruction, perhaps even the instruction that would have been selected by the compiler absent the extreme register restriction. When registers are unavailable for some these instructions, the data must be loaded from memory. The additional memory requests required makes the eventual generated code far less optimal since spilling to memory is inefficient in terms of both program memory and execution time.

From this description, it should be understood that neither prior art technique insures optimal object code.

SUMMARY OF THE INVENTION

This invention initially forces the inputs and outputs to belong to the restricted subset. This generates the most efficient instruction forms every time the restrictions are enforced. However, if registers are unavailable for some such inputs/outputs, this invention makes more registers available to those high pressure inputs/outputs for allocation. It only sends registers to memory if in spite of releasing the larger register set it is still unable to allocate registers to all inputs/outputs.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
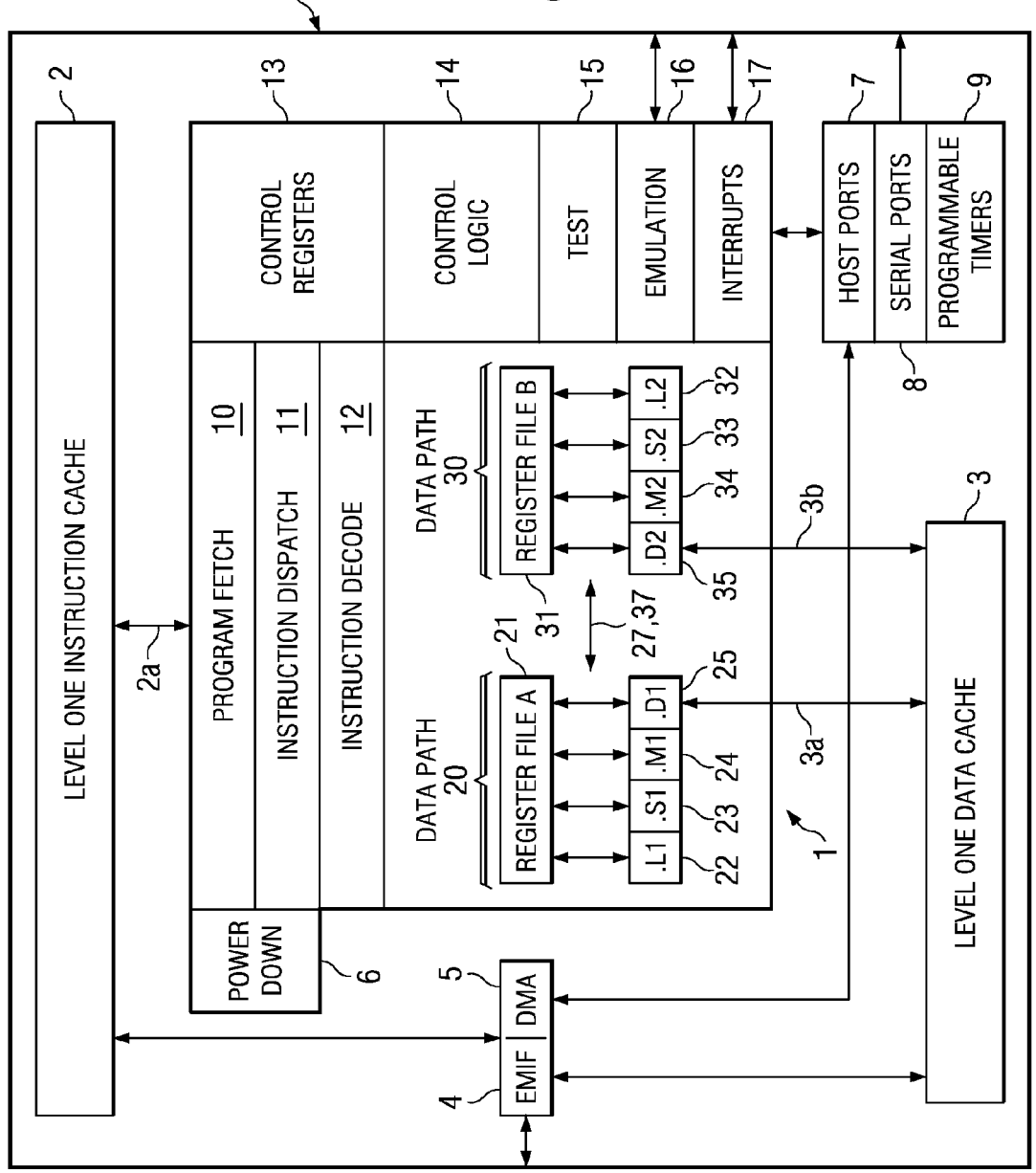
FIG. 1 illustrates a data processor of the type to which this invention is applicable (prior art)

FIG. 1 is a block diagram illustrating details of a digital signal processor integrated circuit 100 suitable but not essential for use in this invention (prior art). The digital signal processor integrated circuit 100 includes central processing unit 1, which is a 32-bit eight-way VLIW pipelined processor. Central processing unit 1 is coupled to level 1 instruction cache 2 included in digital signal processor integrated circuit 100. Digital signal processor integrated circuit 100 also includes level one data cache 3. Digital signal processor integrated circuit 100 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 3 and a program space including level one instruction cache 2. When off-chip memory is used, preferably these two spaces are unified into a single memory space via the external memory interface (EMIF) 4.

Level one data cache 3 may be internally accessed by central processing unit 1 via two internal ports 3a and 3b. Each internal port 3a and 3b preferably has 32 bits of data and a 32-bit byte address reach. Level one instruction cache 2 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. Program fetch unit 10 recalls the next instruction or instructions from level one instruction cache 2 for control of data processing operations. Instruction dispatch unit 11 directs instructions to the appropriate functional unit described below. In this example, central processing unit 1 is an eight-way VLIW pipelined processor. Thus instruction dispatch unit 11 can route up to eight instructions to corresponding functional units. Instruction decode unit 12 decodes the dispatched instructions for the corresponding functional unit. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting limited access to one register in the opposite register file each pipeline stage. The division of the data path into the two data paths 20 and 30 with corresponding register files 21 and 31 reduces the complexity of the register files. Otherwise each of the 32 registers would require 16 read ports and 8 write ports making them very complex and requiring much area to construct. This division reduces the register file complexity to requiring only 8 read ports and 4 write ports. This data path division entails a small reduction in flexibility. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 2 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction.

Figure 2:
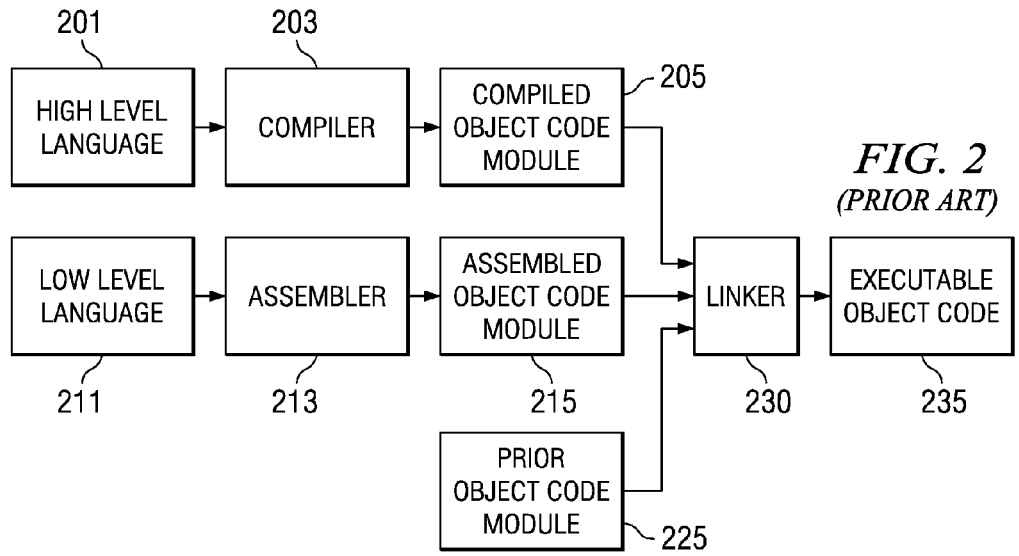
FIG. 2 illustrates the process of program generation which is the field of this invention (prior art)

FIG. 2 illustrates a typical program code generation process according to the prior art. A programmer generates a source code file in a high level language in block 201. The programming language C is suitable for this purpose. The characteristics of such high level languages enable easy use by programmers while hiding the complexity of the hardware. In addition, the high level languages are portable because they have few characteristics that are dependent upon the target central processing unit. In relation to this invention, such high level languages permit the use of symbolic variables and do not require the programmer to consider use of registers such as embodied in register files 21 and 31. Compiler 203 coverts the programmer generated source code in the high level language into a compiled object code module 205. Compiler 203 converts the high level language commands into commands understood by central processing unit 1.

This conversion includes many processes, but only one is important for this invention. Compiler 203 considers the source code symbolic variables and assigns or allocates registers within register files 21 and 31 to store corresponding data. If this process is done well, the computer program needs fewer accesses to memory external to digital signal processor integrated circuit 100. This can occur if the variable can be stored within register file 21 of 31 for all intermediate calculations. Ideally this data is recalled from memory only once, operated upon within register files 21 or 31 and returned to memory only once. Code that needs fewer external memory accesses operates faster than code requiring many such accesses. This ideal is not always possible. Optimum register allocation depends upon the nature of the computation and particularly the number of intermediate variables that must be considered relative to the number or registers available. However, generally good register allocation requires fewer memory accesses. This invention is useful in this register allocation in tiered architectures.

The programmer may also generate source code in a low level language generally known as assembly language. This is illustrated at 211. Assembly language is specific to the target central processing unit. Each assembly instruction preferably has a one-to-one correspondence with object code instructions directly executed by central processing unit 1. Such low level languages also permit symbolic variables but generally expose the register dependency to the programmer. While the programmer has the task of register allocation when using a low level language, this invention could still be used as a tool to aid this allocation. Assembler 213 converts the low level language source file into assembled object code module 215.

Linker 230 joins compiled object code modules 205, assembled object code modules 215 and prior object code modules 225 into executable object code 235. In most cases the program developer will use a high level language and compiler 203. The program developer may use a low level language and assembler 213 for small sections of performance critical code. The program developer will typically also employ previously written compiled or assembled object code modules for that same function in the new application. This process of code generation is advantageously preformed via a code generation program including all these part operating on a personal computer or computer workstation.

This invention is applicable to program generation for central processing units having a tiered architecture. In such a tiered architecture some instructions cannot accesses all provided registers. One example of such a tiered architecture involves multi-length instructions sets. Generally the main instruction set includes 32-bit instructions which have access to all provided registers. A second instruction set includes 16-bit instructions that can implement a subset of the functions of the 32-bit instruction set. Using these 16-bit instructions may involve some loss of efficiency due to the loss of operations in the larger instruction set. Such 16-bit instructions could be used advantageously for less frequently used code where the reduction in code size makes up for the reduced functionality. These 16-bit instructions may be limited to a subset of the provided registers by reducing the register specification bits to save bits for operational codes (op codes). As noted above, there is currently no effective manner of mixing such instructions while preserving the best attributes of each instruction.

With regard to this invention, compiler 203 selects instructions from within the architecture tiers based upon constraints determined by compiler directives in the high level language source code. Compiler 203 is more likely to select an instruction that is shorter and accesses a limited register set if a compiler directive calls for minimum code size. Compiler 203 is more likely to select an instruction that is longer and accesses the whole register set if the compiler directive calls for maximum computational efficiency. This process is known in the compiler art and is not a part of this invention.

This invention operates by first implementing the following helper mechanisms:

A. A mechanism identifies instructions that could have multiple forms with some forms being more efficient than others; and B. For each of the inputs and outputs of these identified more efficient instructions, a mechanism identifies the subset of registers that are accessible and valid.

Figure 3:
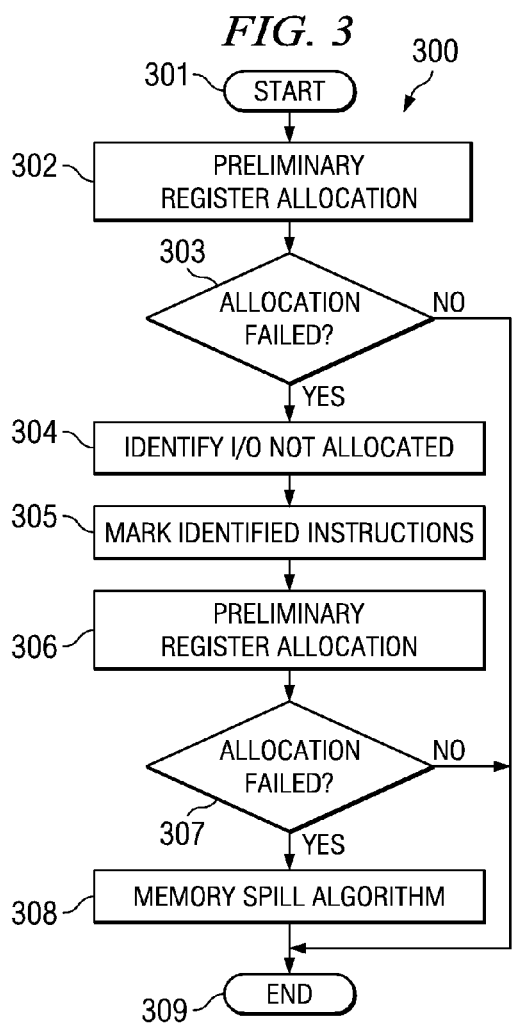
FIG. 3 illustrates process of register allocation within a compiler according to this invention.

FIG. 3 is a flow chart of the register allocation 300 of compiler 200. Register allocation 300 begins at start clock 301. Register allocation 300 then performs a preliminary register allocation 302.

Figure 4:
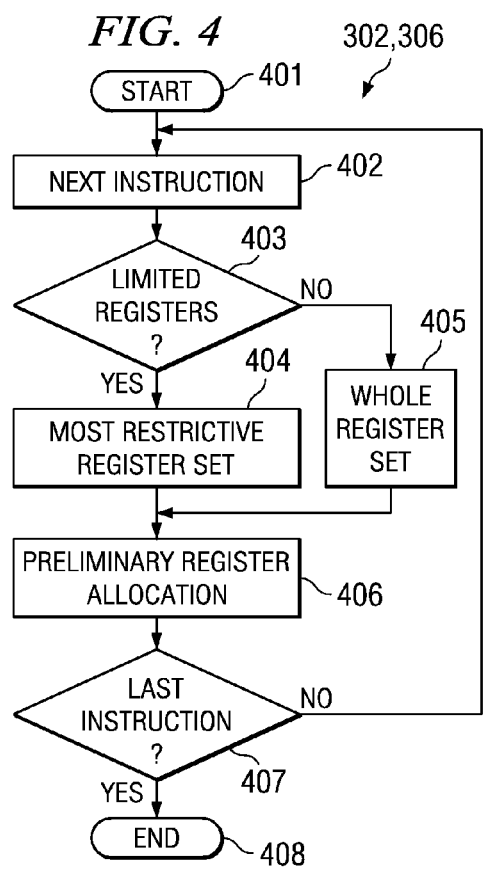
FIG. 4 illustrates the preliminary register allocation process used in this invention.

FIG. 4 is a flow chart of preliminary register allocation 302/306. Preliminary register allocation 302/306 begins at start block 401. Preliminary register allocation 302/306 considers the next instruction in block 402. In the first iteration, this next instruction is the first instruction. Test block 403 determines whether the current instruction is one of the tiered instructions operating on a limited register set using the mechanism noted above. If the current instruction is one of these instructions (Yes at test block 403), then block 404 limits the registers for this instruction to the most restrictive register set. If the current instruction is not one of these instructions (No at test block 403), then block 405 permits use of the entire register set. Block 406 then provides a preliminary register allocation. This preliminary register allocation is based upon the corresponding register set selected in blocks 404 or 405. This preliminary register allocation is performed as known in the art. Test block 407 determines whether the current instruction is the last instruction. If the current instruction is not the last instruction (No at test block 407), then preliminary register allocation 302/306 advances to block 402 to consider the next instruction. If the current instruction is the last instruction (Yes at test block 407), then preliminary register allocation 302/306 is complete and ends at exit block 408. Because register allocation critically depends upon the current algorithm, it is advantageous to perform this preliminary register allocation on limited algorithm modules.

Returning to FIG. 3, test block 303 determines whether the preliminary register allocation failed. It is known that register allocation may fail for some combinations of algorithm and permitted register set. Preliminary register allocation 302/306 includes generation of an indication if the register allocation failed. If the register allocation did not fail (No at test block 303), then register allocation within the most restrictive register set has been determined. In this event register allocation 300 is complete and ends via exit block 309.

If the register allocation did fail (Yes at test block 303), then block 304 identifies register inputs and output that could not be allocated because an instruction could only access a limited register set. Note that register allocation could fail even when the instructions could access the entire register set. Block 304 is only concerned with cases where the failure to allocate a register in one of the tiered instructions accessing only a limited register set. Block 305 marks the identified instructions.

Block 306 performs another preliminary register allocation. This preliminary register allocation processes as previously described in conjunction with FIG. 4 with one exception. In test block 403 those instructions marked in block 305 are now determined to access the whole register set. Thus the marking in block 305 changes the decision in test block 403.

Test block 307 determines whether this second preliminary register allocation failed. If the register allocation did not fail (No at test block 307), then register allocation within the modified register set has been determined. In this event register allocation 300 is complete and ends via exit block 309. If the register allocation did fail (Yes at test block 307), then block 308 performs code generation with memory access for the data which could not be allocated within the registers. This process is called memory spill. This process is known in the program generation art.

This invention is a much more tiered register allocation approach than the known art. This invention will result in more efficient register allocation when compared to the known solutions. This invention has the following advantages. By forcing registers to belong to the restricted register set as needed by the efficient instruction format, this invention generates many more instructions with the most efficient form than any prior solution. Note that blocks 304 and 305 identify and mark only instructions failing register allocation. Thus this invention allocates registers within the most restrictive register set for instructions when feasible. By releasing more registers for usage in high pressure regions of code instead of spilling to memory, this invention results in a much more efficient register allocation than any prior solution. Thus this invention will use an instruction form permitting access to the whole register set if that will result in register allocation rather than perform a memory spill operation with the corresponding instruction limited to the more restrictive register set.

An alternative embodiment of this invention is useful with instruction sets having more than two tiers. Test block 403 and 404 operate slightly differently for instructions having three or more register tiers. Test block 403 identifies instructions having less restrictive register sets than those already attempted. If found by test block 403, block 404 permits the next less restrictive register set for that instruction. Register allocation 300 repeats a loop including blocks 304, 305, 306 and 307 until register allocation succeeds or register allocation of all tiers of the critical instructions has been attempted. This makes the invention scalable in tiers. Registers can be released in any number of tiers as needed. Thus this invention can allocate registers even if an instruction has more than two forms each using a larger set of registers than the other.

What is claimed is:

1. A method of data register allocation in a computer instruction set having tiered instructions whereby corresponding instructions of differing tiers access differing data register sets including differing numbers of data registers comprising the steps of:

making a first preliminary attempt to allocate data registers for operand storage using an initially specified data register set for each instruction;

if the first preliminary attempt to allocate data registers fails identifying any tiered instruction having an initially specified tier with a corresponding data register set less than all data registers having an input or output variable not data register allocatable, and making a second preliminary attempt to allocate data registers for operand storage using the initially specified data register set for each instruction except using a corresponding instruction of a differing tier having a less restrictive data register set for the identified tiered instructions.

2. The method of data register allocation of claim 1, further comprising the step of:

if the second preliminary attempt to allocate data registers for operand storage fails, coding any instruction having an input or output variable not allocatable for memory access.

3. The method of data register allocation of claim 1, wherein:

the tiered instructions include corresponding instructions having more than two tiers, each tier accessing differing data register sets having differing numbers of data registers;

said step of making a second preliminary attempt to allocate data registers for operand storage using the initially specified data register set for each instruction except uses a corresponding instruction of a next tier having a next less restrictive data register set for the identified tiered instructions;

said method further comprising the steps of:

if the second preliminary attempt to allocate data registers for operand storage fails identifying any tiered instruction having an initially specified data register set less than all data registers having an input or output variable not data register allocatable, and making a subsequent preliminary attempt to allocate data registers for operand storage using the initially specified data register set for each instruction except using a corresponding instruction of a next tier having a next less restrictive data register set for the identified tiered instructions;

if a subsequent preliminary attempt to allocate data registers for operand storage fails, repeating said identifying and making a subsequent preliminary attempt to allocate data registers until attempting to allocate data registers for operand storage for all identified tiered instructions using the entire data register set.

4. The method data register allocation of claim 3, further comprising the step of:

if a last subsequent preliminary attempt to allocate data registers for operand storage fails, coding any instruction having an input or output variable not allocatable for memory access.

5. A compiler method for a computer instruction set having tiered instructions whereby corresponding instructions of differing tiers access differing data register sets including differing numbers of data registers comprising the steps of:

receiving high level language source code and compiler directives from a programmer;

generating executable object code from the received high level language source code and compiler directives including the steps of generating preliminary object code selecting an initially specified tier of data registers for each instruction dependent upon the compiler directives, making a first preliminary attempt to allocate data registers for operand storage using the initially specified tier and the corresponding data register set for each instruction;

if the first preliminary attempt to allocate data registers fails identifying any tiered instruction having an initially specified tier and corresponding data register set less than all data registers having an input or output variable not data register allocatable, and making a second preliminary attempt to allocate data registers for operand storage using the initially specified tier and corresponding data register set for each instruction except using a corresponding instruction of a differing tier having a less restrictive data register set for the identified tiered instructions;

if the second preliminary attempt to allocate data registers for operand storage fails, coding any instruction having an input or output variable not allocatable for memory access;

if either the first or second preliminary attempt to allocate data registers for operand storage succeeds, generating executable object code corresponding to the preliminary object code.

6. The compiler method of claim 5, wherein:

the tiered instructions include corresponding instructions having more than two tiers, each tier accessing differing data register sets having differing numbers of data registers;

said step of making a second preliminary attempt to allocate data registers for operand storage using the initially specified data register set for each instruction except using a corresponding instruction of a differing tier having a less restrictive data register set for the identified tiered instructions uses a corresponding instruction of a next tier having a next less restrictive data register set for the identified tiered instructions;

said method further comprising the steps of:

if the second preliminary attempt to allocate data registers for operand storage fails identifying any tiered instruction having an initially specified data register set less than all data registers having an input or output variable not data register allocatable, and making a subsequent preliminary attempt to allocate data registers for operand storage using the initially specified data register set for each instruction except using a corresponding instruction of a next tier having a next less restrictive data register set for the identified tiered instructions;

if a subsequent preliminary attempt to allocate data registers for operand storage fails, repeating said identifying and making a subsequent preliminary attempt to allocate data registers for operand storage until attempting to allocate data registers for all identified tiered instructions using the entire data register set; and if a last subsequent preliminary attempt to allocate data registers for operand storage fails, coding any instruction having an input or output variable not allocatable for memory access.

* * * * *